United States Patent
Hewinson

(10) Patent No.: US 8,515,025 B1
(45) Date of Patent: Aug. 20, 2013

(54) CONFERENCE CALL VOICE-TO-NAME MATCHING

(75) Inventor: Philip Hewinson, London (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/599,683

(22) Filed: Aug. 30, 2012

(51) Int. Cl.
*H04M 1/64* (2006.01)

(52) U.S. Cl.
USPC .................. 379/88.02; 379/88.01; 379/88.19; 379/142.01

(58) Field of Classification Search
USPC ........................................... 379/88.01–88.04
See application file for complete search history.

(56) References Cited

U.S. PATENT DOCUMENTS

| | | | |
|---|---|---|---|
| 5,668,863 A | 9/1997 | Bieselin et al. | |
| 6,823,050 B2 | 11/2004 | Brown et al. | |
| 7,099,448 B1 | 8/2006 | Laniepce et al. | |
| 7,844,454 B2 | 11/2010 | Coles et al. | |
| 2005/0041783 A1* | 2/2005 | Timmins et al. | 379/88.02 |
| 2005/0207554 A1* | 9/2005 | Ortel | 379/202.01 |
| 2006/0188076 A1* | 8/2006 | Isenberg | 379/88.02 |
| 2009/0046841 A1 | 2/2009 | Hodge | |
| 2009/0086949 A1 | 4/2009 | Caspi et al. | |
| 2009/0089055 A1 | 4/2009 | Caspi et al. | |
| 2011/0260832 A1* | 10/2011 | Ross et al. | 340/5.84 |

* cited by examiner

*Primary Examiner* — Joseph J Nguyen
(74) *Attorney, Agent, or Firm* — Remarck Law Group PLC

(57) ABSTRACT

A method for conducting a teleconference between participants over a teleconference system is disclosed. The teleconference system can include a server in communication with a plurality of client terminals. A first utterance may include a plurality of words, including an identifier of one of the plurality of participants and at least one additional word, may be received. The server can recognize the plurality of words and parse the identifier from the at least one additional word. The identifier may be associated to a voiceprint of the one of the plurality of participants. A second utterance can be obtained and compared to the voiceprint in order to determine that the identifier is associated with the second utterance. The identifier can be provided from the server to at least one client terminal in response to determining that the identifier is associated with the second utterance.

20 Claims, 4 Drawing Sheets

| DATABASE | | | |
|---|---|---|---|
| IDENTIFIER | VOICEPRINT | BACKGROUND NOISE | MICROPHONE |
| JOHN | V.P. 1 | B.G.N. 1 | MIC 1 |
| JANE | V.P. 2 | B.G.N. 2 | MIC 2 |
| TOM | V.P. 3 | B.G.N. 3 | MIC 3 |
| MIKE | V.P. 4 | B.G.N. 3 | MIC 3 |
| ⋮ | ⋮ | ⋮ | ⋮ |
| PAULINE | V.P. N | B.G.N. N | MIC N |

FIG. 3

CONFERENCE CALL VOICE-TO-NAME MATCHING

FIELD

The present disclosure relates to methods of conducting a conference call and, more particularly, to methods of conducting a conference call in which the utterances of the participants are matched to respective identities for later distinguishing between different participants.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A conference call or teleconference is a type of remote communication between three or more people. The parties can communicate over a traditional telephone communication system, a Voice-Over-Internet Protocol (VoIP) based communication system, or other type of communication system.

There are various types of conference call methods. For instance, one person (the "calling party") can call another to establish a line of communication and can subsequently dial additional phone numbers to add additional persons to the teleconference. In additional embodiments, each participant can call a designated phone number or "conference bridge" to establish the lines of communication. In still additional embodiments, a person can call a single telephone number, which connects to a speaker phone, and multiple other people can participate in the conference call via that speaker phone.

In each of these and other conference call methods, there can be some confusion as to the identity of the speakers at any given time. To clear the confusion, a participant can interrupt the call to ask which participant is speaking; however, this type of interruption can negatively affect the flow of information. On the other hand, if the confusion is not cleared, then the confused participant(s) can be distracted from the subject matter of the call, the confused participant(s) may not be able to respond effectively, or the confusion can otherwise negatively affect the conference call.

SUMMARY

In some embodiments of the present disclosure, a computer-implemented method for conducting a teleconference between a plurality of participants over a teleconference system is disclosed. The teleconference system can include a server that is in communication with a plurality of client terminals. The method can include receiving a first utterance by the server and from one of the client terminals. The first utterance can include a plurality of words, which may include an identifier of one of the plurality of participants and at least one additional word. The method may further include recognizing, by the server, the plurality of words and parsing, by the server, the identifier from the at least one additional word. Additionally, the method can include obtaining a voiceprint of the one of the plurality of participants from at least one of the first utterance, a previously recorded utterance, and a second utterance that is uttered by the one of the plurality of participants. The voiceprint can include a set of vocal characteristics that can be used to identify speech as originating from the one of the plurality of participants.

The server may associate the identifier to the voiceprint. The method can also include receiving, by the server and from one of the client terminals, a third utterance from the one of the plurality of participants. The server can compare the third utterance to the voiceprint and, based on this comparison, determine that the identifier is associated with the third utterance. The method can further include receiving, by the server and from one of the plurality of client terminals, a query as to which participant uttered the third utterance. Additionally, the method can include providing the identifier to the one of the plurality of client terminals from the server in response to the query.

In various embodiments, the present disclosure relates to a computer-implemented method for conducting a teleconference between a plurality of participants over a teleconference system. The teleconference system can include a server that is in communication with a plurality of client terminals. The method may include receiving, by the server and from one of the client terminals, a first utterance. The first utterance may include a plurality of words, which can include an identifier of one of the plurality of participants and at least one additional word. The server can recognize the plurality of words and parse the identifier from the at least one additional word. The method can include associating, by the server, the identifier to a voiceprint of the one of the plurality of participants. The voiceprint can include a set of vocal characteristics that can be used to identify speech as originating from the one of the plurality of participants. The method can include receiving a second utterance from the one of the plurality of participants and comparing the second utterance to the voiceprint. Based on comparing the second utterance to the voiceprint, the method may include determining that the identifier is associated with the second utterance. Finally, the identifier can be provided from the server to at least one client terminal in response to determining that the identifier is associated with the second utterance.

In various embodiments, the method can further include obtaining the voiceprint by the server. The first utterance may be uttered by the one of the plurality of participants. Further, obtaining the voiceprint can include obtaining the voiceprint from the first utterance, and/or obtaining the voiceprint includes obtaining the voiceprint from a previously recorded utterance. In some embodiments, the first utterance may be uttered by another participant other than the one of the plurality of participants, wherein obtaining the voiceprint includes obtaining the voiceprint from a third utterance from the one of the plurality of participant. Additionally, the method can further include receiving, by the server and from at least one of the client terminals, a query as to which participant uttered the second utterance, wherein providing the identifier includes providing the identifier in response to the query. Providing the identifier in response to the query can include providing a textual message representative of the identifier and/or providing an audible message representative of the identifier.

The method can additionally include receiving, by the server and from the one of the plurality of client terminals, an initial background noise that is local to the one of the plurality of participants, associating the initial background noise to the identifier and the voiceprint, receiving a second background noise with the second utterance, and comparing the second background noise to the initial background noise in order to confirm that the one of the plurality of participants uttered the second utterance.

In some embodiments, the teleconference system can include a plurality of microphones. In these embodiments, the method can include associating, by the server, each of the plurality of microphones with corresponding ones of the plurality of participants, determining, by the server, which one of the plurality of microphones received the second utterance, and confirming that the one of the plurality of participants uttered the second utterance based on which of the plurality of microphones received the second utterance.

In some embodiments of the present disclosure, a teleconference system is disclosed. The system can include a plurality of client terminals for respective ones of a plurality of participants. The system can further include a server that is in communication with the plurality of client terminals. The server can be configured to receive a first utterance from one of the plurality of client terminals. The first utterance can include a plurality of words, which can include an identifier of one of the plurality of participants and at least one additional word. The server can be further configured to recognize the plurality of words, parse the identifier from the at least one additional word, and associate the identifier to a voiceprint of the one of the plurality of participants. The voiceprint can include a set of vocal characteristics that can be used to identify speech as originating from the one of the plurality of participants. The server can also be configured to receive a second utterance from the one of the plurality of participants and compare the second utterance to the voiceprint. The server may be configured to determine that the identifier is associated with the second utterance in response to the comparison of the second utterance to the voiceprint, and provide the identifier to at least one client terminal in response to determining that the identifier is associated with the second utterance.

In various embodiments, the server can be further configured to obtain the voiceprint from the first utterance when the first utterance is uttered by the one of the plurality of participants, obtain the voiceprint from a previously recorded utterance uttered by the one of the plurality of participants, and/or obtain the voiceprint from a third utterance when the first utterance is uttered by another participant other than the one of the plurality of participants. The server can also be configured to receive a query as to which participant uttered the second utterance, and provide the identifier in response to the query. The server may also be configured to provide a textual message representative of the identifier and/or provide an audible message representative of the identifier. The server can be further configured, in some embodiments, to receive an initial background noise that is local to the one of the plurality of participants, associate the initial background noise to the identifier and the voiceprint, receive a second background noise with the second utterance, and compare the second background noise to the initial background noise in order to confirm that the one of the plurality of participants uttered the second utterance.

The system can further include a plurality of microphones. In these embodiments, the server can be further configured to associate each of the plurality of microphones with corresponding ones of the plurality of participants, determine which one of the plurality of microphones received the second utterance, and confirm that the one of the plurality of participants uttered the second utterance based on which of the plurality of microphones received the second utterance.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 3 is a table illustrating how identities of teleconference participants, voiceprints, and other data can be associated within a database of the system of FIG. 1;

DETAILED DESCRIPTION

Figure 1:
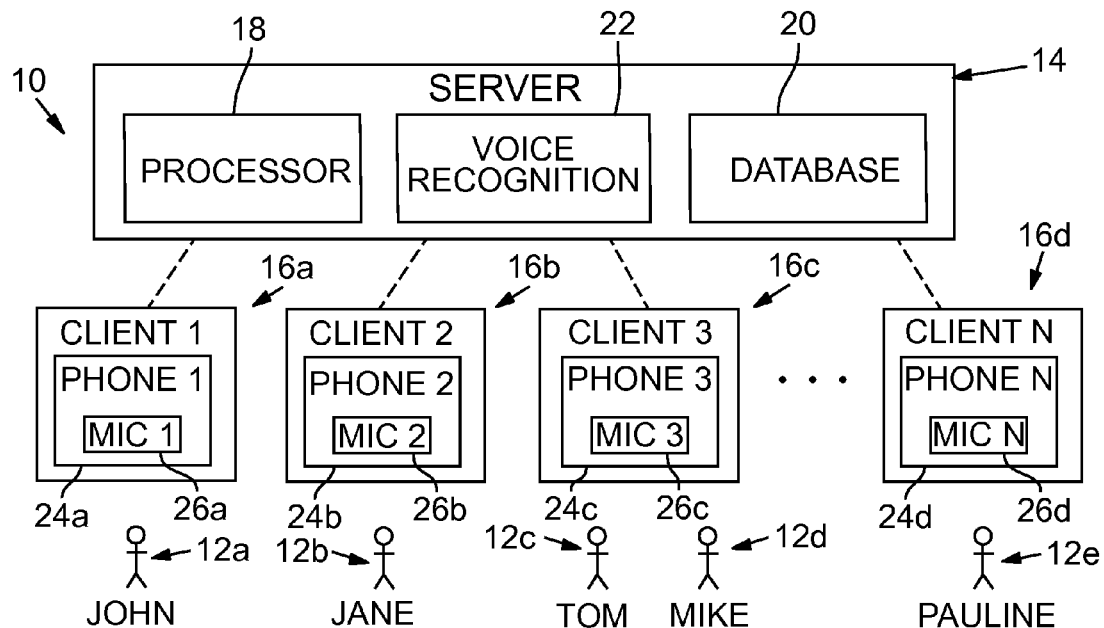
FIG. 1 is a schematic illustration of a system for conducting a teleconference according to some embodiments of the present disclosure.

Referring initially to FIG. 1, a system 10 for conducting a teleconference between a plurality of participants 12a, 12b, 12c, 12d, 12e is illustrated. The system 10 can generally include a server 14 and a plurality of client terminals 16a, 16b, 16c, 16d that communicate via traditional telephony, Voice-Over-Internet-Protocol (VoIP), a wireless or cellular telephone network, satellite communications, and/or another communications network. As will be discussed, the system 10 can allow the participants 12a-12e to communicate with each other remotely. The system 10 can also provide the identity of a particular speaker to the other participants 12a-12e during the course of the teleconference. Accordingly, the participants 12a-12e can be well informed as to the identity of each speaker, such that the teleconference can be conducted more effectively.

The server 14 can be a computer device that includes one or more processor(s) 18, computer memory with a database 20, a voice recognition module 22, and other components. It should be appreciated that the server 14 can include hardware and software for establishing communication with the client terminals 16a, 16b, 16c.

The client terminals 16a-16d can each be a computer device with one or more processor(s), computer memory, and other components. Also, each client terminal 16a-16d can include a respective telephone 24a, 24b, 24c, 24d or similar communications device for communicating with the server 14 and the other client terminals 16a-16d. Each telephone 24a, 24b, 24c, 24d can include a microphone 26a, 26b, 26c, 26d as well as a speaker (not shown) for providing two-way communications. For example only, one or more of the client terminals 16a-16d can be at least partially embodied by a so-called "smartphone."

In some embodiments, the voice recognition module 22 of the server 14 can include software that is able to recognize words that have been uttered by the participants 12a-12e. Also, the voice recognition module 22 can be operable to detect unique audible characteristics or "voiceprints" of the participants 12a-12e. A "voiceprint" can include a set of one or more vocal characteristics that can be used to identify speech as originating from a specific person, such as one of the plurality of participants 12a-12e. Example vocal characteristics in a voiceprint include, but are not limited to, unique vocal patterns, accents, timbres, inflections, and pace of speech. Additionally, the voice recognition module 22 can be operable to recognize certain keywords, such as the names of the participants 12a-12e, from the utterances of the participants 12a-12e.

For instance, the voice recognition module 22 can recognize each word in the utterance, "My name is John," and the module 22 can also detect that the name "John" is included in that utterance and parse that name from the other words as will be discussed in greater detail below. In some embodiments, the module 22 can detect that a name has been uttered according to the context of the utterance (e.g., according to the circumstances that form the setting for the statement) as will be discussed.

Additionally, the voice recognition module 22 can include speech recognition capabilities for recognizing the words being spoken and for translating those words into textual data. Thus, the module 22 can record a transcript of the teleconference in some embodiments and/or the utterances can be recorded and used in other ways as will be discussed in greater detail below.

In FIG. 1, the server 14 is shown as being remote from each of the participants 12a-12e; it should be appreciated, however, that the server 14 could be local to one of the participants 12a-12e without departing from the scope of the present disclosure. In some embodiments, the server 14 can be directly associated with a so-called "conference bridge." Thus, by calling the designated conference bridge phone number, the client terminals 16a-16d can establish a respective line of communication with the server 14 for conducting the teleconference methods discussed below. Also, in some embodiments, one participant 12a-12e (an "initiator") can dial the phone numbers of each of the other participants 12a-12e to establish the lines of communication, and the initiator's computer or phone could operate as the server 14 for providing voice recognition and for identifying the speakers during the teleconference. Moreover, the server 14 can rely on local computing and/or the server 14 can rely on so-called "cloud computing" to complete the teleconferencing techniques of the present disclosure. Additionally, in some embodiments, the server 14 can transmit data to a client terminal 16a-16d, and that client terminal 16a-16d can provide processing and computing for voice recognition, for identifying the participants 12a-12e, etc. Thus, it will be appreciated that the teleconferencing techniques disclosed herein can be performed in various ways by the server 14 and/or the client terminals 16a-16d without departing from the scope of the present disclosure.

As shown in FIG. 1, each participant 12a-12e has a particular identifier, such as a first name, a surname, a codename, etc. In the embodiments illustrated, participant 12a is named "John," and he is local to client terminal 16a. Similarly, participant 12b is named "Jane," and she is local to client terminal 16b. Furthermore, participant 12c is named "Tom" and participant 12d is named "Mike," and they are both local to client terminal 16c. Stated differently, the telephone 24c can be a speaker phone, and both participants 12c and 12d can communicate within the teleconference via the same telephone 24c. Lastly, participant 12e is named "Pauline," and she is local to client terminal 16d. It will be appreciated, however, that the system 10 can allow teleconferencing between any number of participants 12a-12e, between any number of client terminals 16a-16d, between any number of telephones 24a-24d.

Figure 2:
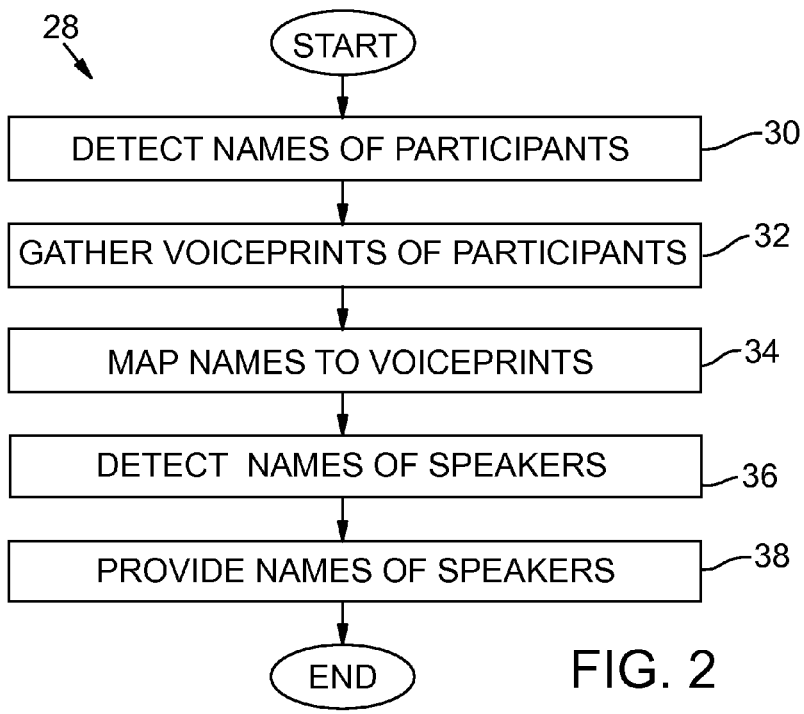
FIG. 2 is a flowchart generally illustrating a technique of conducting the teleconference using the system of FIG. 1 according to some embodiments of the present disclosure.

Referring now to FIG. 2 a technique 28 of conducting the teleconference is illustrated generally according to various example embodiments. For instance, the technique 28 can begin in block 30, wherein the server 14 can detect the names or other identifiers of the participants 12a-12e. In some embodiments, the server 14 can recognize the names of the participants 12a-12e as those names are uttered during the teleconference.

Also, in some embodiments, the voice recognition module 22 can detect the names or identifiers of the participants 12a-12e from the context, syntax, etc. of the utterances during the teleconference. For instance, the voice recognition module 22 can be operable to specifically detect the phrase "My name is _____" or other predetermined introductory phrase when uttered during the teleconference, and by recognizing the introductory phrase, the voice recognition module 22 can be alerted that a name is about to be uttered. Once the name is uttered, the voice recognition module 22 can detect the name contained within that introduction. Moreover, introductions are likely to occur at the beginning of the teleconference; therefore, the server 14 can monitor the teleconference for names within a predetermined amount of time from the beginning of the teleconference. Additionally, the voice recognition module 22 can be operable to detect the names of the participants 12a-12e by attempting to match uttered names to a predetermined set of names.

In block 32 of FIG. 2, the server 14 and voice recognition module 22 can gather voiceprints from the participants 12a-12e (e.g., the timbre, inflection, accent, and/or other vocal characteristics that are unique to the participant 12a-12e). The server 14 can gather the voiceprints in a variety of ways. In some embodiments, the participants 12a-12e can be prompted by the server 14 to provide a voice sample (e.g., by requiring the participant 12a-12e to repeat a predetermined phrase) from which the voiceprint can be gathered. Moreover, in some embodiments, the voice recognition module 22 can detect and differentiate between the voiceprints of the participants 12a-12e during the teleconference to obtain the voiceprints. In still additional embodiments, the server 14 can have access to previously recorded voice samples (e.g., samples that are stored on a social network, and samples that are included in an outgoing voicemail greeting, etc.).

At block 34, the server 14 can map or otherwise associate the names detected in block 30 with the voiceprints gathered in block 32. More specifically, the voiceprints and names can be associated and stored in the database 20. Exemplary embodiments of the database 20 are illustrated in FIG. 3, where voiceprints (identified as "V.P. 1," "V.P. 2," "V.P. 3," "V.P. 4," and "V.P. N") are associated in the same row with the respective name ("John," "Jane," "Tom," "Mike," and "Pauline"). Additional data can also be associated as shown in FIG. 3. For instance, as shown in the third column of FIG. 3, the server 14 can receive (via the client terminals 16a-16d), process, and store a sample of the background noise occurring at each client terminal 16a, 16b, 16c, 16d, and this sample can be associated with the name and voiceprint of the corresponding participant 12a-12e. Still further, the server 14 can differentiate between the microphone 26a-26d used by each participant 12a-12e, and the server 14 can associate the microphones 26a-26d with the name and voiceprint of the corresponding participant 12a-12e.

It will be appreciated that blocks 30, 32, and 34 can represent an initialization or set-up of the teleconferencing technique 28. Subsequently, this data can be accessed and used by the server 14 to identify the speakers during the remaining portion of the teleconference as will be discussed.

Thus, in block 36, the server 14 can detect the identifiers (identities of the speakers) during the teleconference. In some embodiments, the voice recognition module 22 can monitor the teleconference and attempt to continuously match each utterance to the voiceprints gathered in block 30. If a match is found, then the server 14 can find the associated name, and the server 14 can ultimately detect the identity of each speaker.

At block 38, the server 14 can provide the identifiers of the speakers to one or more of the participants 12a-12e. In some embodiments, the server 14 can provide the identifier of the speaker only in response to a specific query from one of the participants 12a-12e. For instance, if participant 12a is speaking and participant 12b is confused as to the identity of the speaker, then participant 12b can send a query to the server 14 (e.g., by pushing a designated button on the telephone 24b). In response, the server 14 can reply to the query and inform the participant 12b that "John" is currently speaking. This reply message can be transmitted only to the client terminal that sent the query (client terminal 16b in the above example), or the reply can be transmitted to more client terminals 16a-16d. The reply message itself can be an audio or textual message that is representative of the identifier of the current speaker. For instance, an audio message can play over the audio of the teleconference conversation. Also, a textual message can be sent from the server 14 to be displayed at one or more of the client terminals 16a-16d.

As such, the system 10 can provide the identities of each of the speakers during the teleconference. Thus, the participants 12a-12e can be well informed as to what is said and as to the identities of the speakers. Accordingly, the teleconference can be conducted in a more effective and constructive manner.

Figure 4:
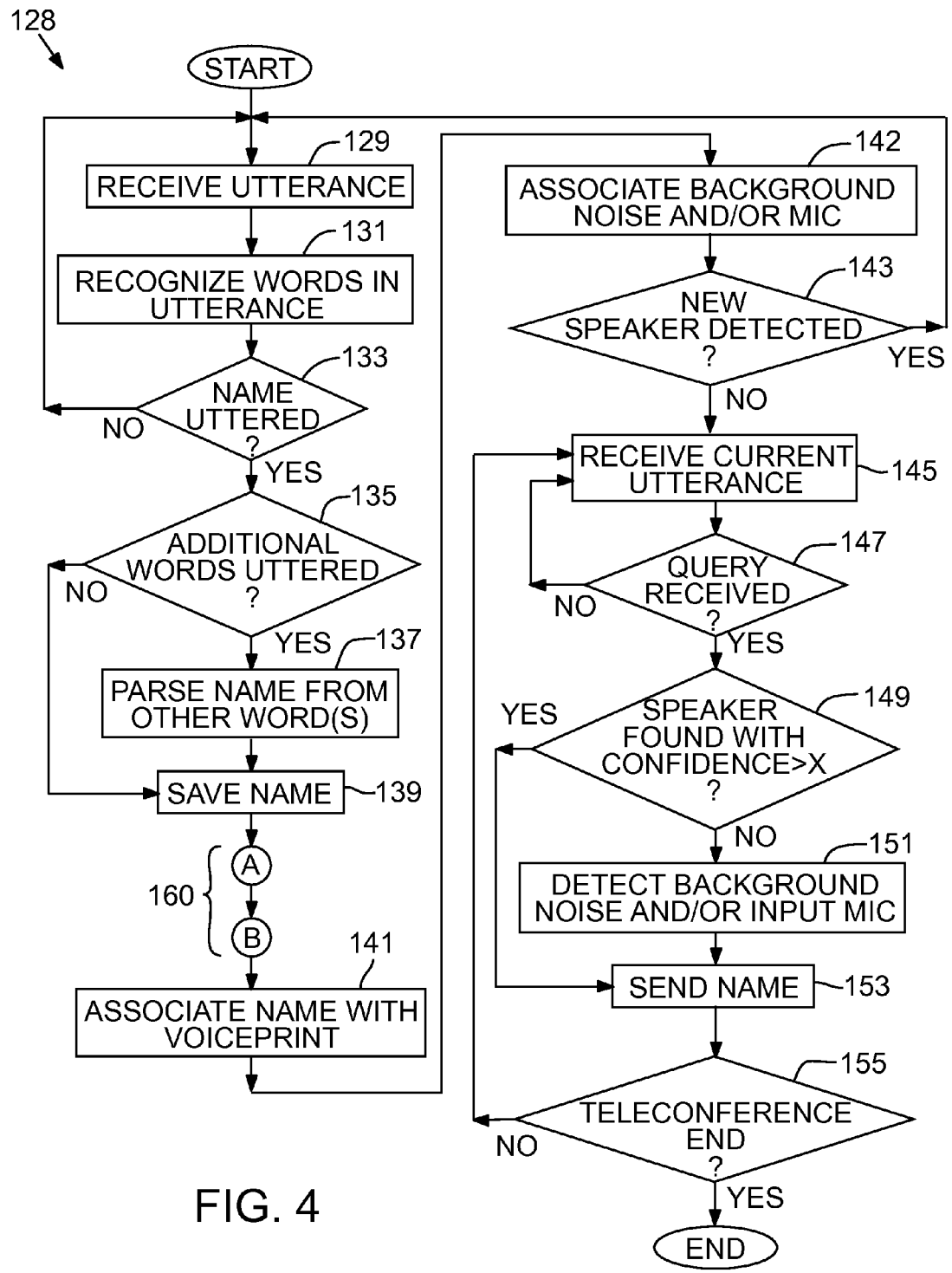
FIG. 4 is a flowchart illustrating a technique of conducting the teleconference using the system of FIG. 1 according to additional embodiments of the present disclosure.

Referring now to FIG. 4, additional embodiments of the technique 128 for conducting the teleconference are illustrated. It will be appreciated that the technique 128 represented in FIG. 4 can follow and incorporate the technique 28 represented in FIG. 2.

As shown, the technique 128 can begin in block 129 (e.g., at the beginning of the teleconference), and the server 14 can receive an utterance from one of the participants 12a-12e. For purposes of discussion, it will be assumed that the participant 12a states "This is John calling from Denver, Colo." at client terminal 16a, and this utterance is transmitted to the server 14 in block 129. At block 131, the voice recognition module 22 processes this utterance to recognize each word. At decision block 133, it is determined whether a name has been uttered. The server 14 can rely on a predetermined list of potential names and attempt to match "John" to names included on that list. If a match is found, then decision block 133 can be answered affirmatively, and decision block 135 can follow. (If the utterance received in block 129 did not contain a name (block 133 answered negatively), then the technique 128 would loop back to block 129 and the server 14 would await subsequent utterances.)

Continuing with the example, it is determined whether the statement "This is John calling from Denver, Colo." contains words in addition to the name "John." In this example, the statement does include additional words ("This is" and "calling from Denver, Colo."). Therefore, decision block 135 is answered affirmatively, and block 137 can follow. However, if the utterance received in 129 does not include additional words, then the technique 128 can skip block 137 and go to block 139.

In block 137, the server 14 can parse the name (e.g., "John" from the example above) from the rest of the utterance received in block 129. Then, in block 139, the name can be saved in the database 20 as represented in FIG. 3.

Next, the server 14 can obtain a voiceprint (a unique and identifying tone, timbre, inflection, etc.) for the participant 12a now that the participant 12a has been identified by the name "John." This can be a subroutine represented from block A to block B in FIG. 4 and will be discussed in detail below in relation to FIG. 5.

Assuming that the voiceprint for participant 12a is available, block 141 can follow. In block 141, the server 14 can associate the name saved in block 139 to the corresponding voiceprint for the participant 12a as represented in FIG. 3.

At block 142, the server 14 can detect any background noise that is included within the utterance received in block 129, and/or the server 14 can detect which microphone 26a-26d received the utterance of block 129. This data can be stored in the database 20 and associated with the names and voiceprints as shown in FIG. 3.

At block 143, the server 14 can determine whether there are additional participants 12a-12e that have not been registered with a name and/or voiceprint. In some embodiments, the server 14 can monitor the teleconference to determine if new participants 12a-12e have joined the teleconference. For instance, if the server 14 is unable to match the current speaker to any voiceprint in block 35, then the server 14 can determine that a new participant 12a-12e has entered the teleconference. Otherwise, the server 14 can detect new participants 12a-12e by detecting that a new line of communication has been established with a client terminal 16a-16d. When a new participant 12a-12e has joined, the voice recognition module 22 can gather a new voiceprint and a name of the new participant 12a-12e according to the techniques represented in block 129 through block 141. Assuming that all of the participants 12a-12e have been accounted for, the technique 128 can continue in block 145.

The teleconference can continue with the participants 12a-12e speaking as in a normal conversation. Each new speaker can provide a new "current utterance" that is received by the server 14 in block 145. Also, in block 145, the server 14 can perform speech recognition on each current utterance by each participant 12a-12e. Also, the server 14 can attempt to match the current utterance to a corresponding voiceprint stored in the database 20. It follows, then, that when a match is found, the server 14 can identify the current speaker of each utterance during the remaining portion of the teleconference.

In some embodiments, the server 14 can provide the name of each current speaker as the name of the current speaker changes to at least one of the client terminals 16a-16d. However, in the embodiments illustrated in FIG. 4, the server 14 only identifies the current speaker in response to specific queries. Stated differently, if a participant 12a-12e is unclear as to which participant is currently speaking during the teleconference, then the participant 12a-12e can send a query to the server 14 to find out (e.g., by pressing a button on the respective telephone 24a-24d).

As shown in decision block 147, the server 14 can determine whether any queries have been received. If not, then the technique 128 returns to block 145, and the server 14 can continue to monitor the identities of each speaker. However, if a query is received (decision block 147 answered affirmatively), then decision block 149 follows, and the server 14 can determine whether the current utterance matches any of the stored voiceprints. If a match is found with a predetermined degree of confidence (confidence greater than a threshold "X"), then block 149 is answered affirmatively, and block 153 follows, wherein the server 14 supplies the name of the current speaker of the current utterance. As stated above, the name can be delivered as a text message that is displayed at the corresponding client terminal 16a-16d and/or by an audible message that is played over the audio of the teleconference.

If the current utterance does not match any of the stored voiceprints within the predetermined degree of confidence (block 149 answered negatively), then the server 14 can attempt to confirm the identity of the current speaker in additional ways. For instance, the server 14 can detect the background noise that is included within the current utterance, and the server 14 can match this detected background noise to the background noise detected in block 142. By matching the background noise, the server 14 can confirm the identity of the current speaker with added confidence.

Instead of, or in addition to detecting the current background noise, block 151 can include detecting which of the microphones 26a-26d received the utterance received in block 145. This information can be compared to the microphone associated with the respective participants 12a-12e in block 142. Thus, by determining which microphone received the current utterance, the server 14 can find the associated name of the current speaker, and the name of the current speaker can be sent out in block 153 to the querying client terminal 16a-16d.

The technique 128 can then continue in block 155, wherein the server 14 determines whether the teleconference has ended. The server 14 can determine the end of the teleconference in various ways. For instance, the server 14 can detect that all of the client terminals 16a-16d have disconnected to determine the end of the teleconference. The server 14 can also rely on the voice recognition module 22 to detect the participants 12a-12e saying "goodbye" or other similar statement to determine that the teleconference is ending. If the teleconference has not ended (decision block 155 answered negatively), then the technique 128 can return to block 145. If the teleconference has ended (decision block 155 answered affirmatively), then the technique 128 can end.

Figure 5:
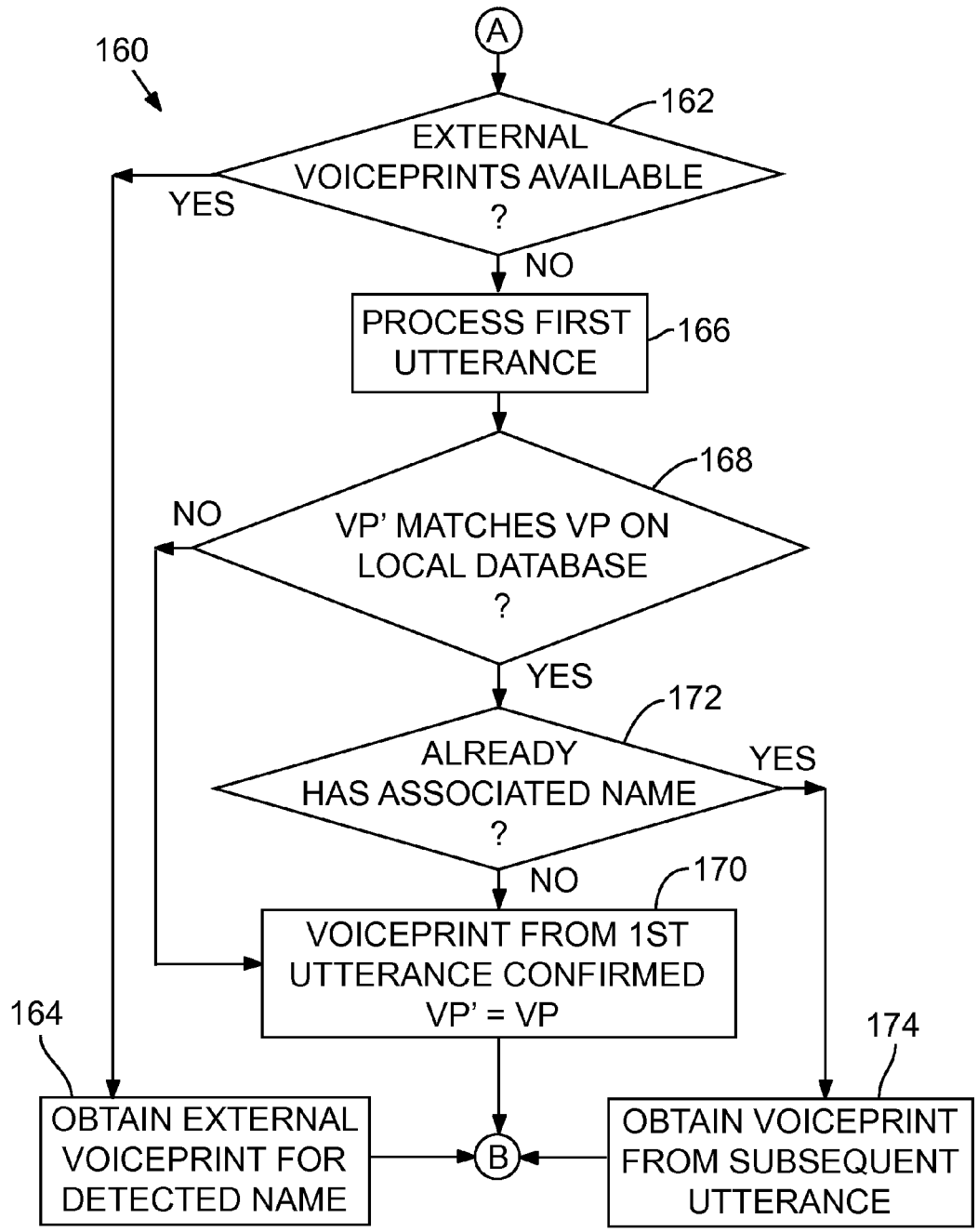
FIG. 5 is a flowchart illustrating a technique of gathering voiceprints for the participants of the teleconference.

Referring now to FIG. 5, an exemplary technique 160 for detecting and gathering voiceprints of the participants 12a-12e are discussed. This technique 160 can be included in the technique 128 shown in FIG. 4. For instance, the technique 160 can be included between A and B in the embodiments of FIG. 4.

As shown, in block 162 the server 14 can determine whether external sources with previously stored voiceprints are available (e.g., social networks, outgoing voice mail messages). If previously stored voiceprints are available (block 162 answered affirmatively), then block 164 can follow, and the server 14 can search a social network, etc. for an audible sample of the participants' voice. The voiceprint(s) can be obtained from these audio samples. In additional embodiments, the server 14 can call the telephone 24a-24d for one or each of the participants 12a-12e. Since the telephone 24a-24d will be presumably "busy" due to participation in the teleconference, an outgoing voicemail message will likely play back, and the voiceprint can be obtained therefrom.

If external voiceprints are unavailable (block 162 answered negatively), then block 166 can follow. In block 166, the server 14 can process the utterance received in block 129 (FIG. 4) to obtain a preliminary voiceprint, VP'''.

At decision block 168, it is determined whether the preliminary voiceprint VP''' matches any voiceprints already stored in the database 20. If not, then block 170 can follow, and the server 14 can store the preliminary voiceprint VP''' as an actual voiceprint VP for one of the participants 12a-12e in the database 20 as shown in FIG. 3.

However, if the preliminary voiceprint VP''' matches a voiceprint already stored in the database 20 (decision block 168 answered affirmatively), then the server 14 can determine whether the preliminary voiceprint VP''' has a name in the database 20 already associated therewith.

If there is already a name associated with the preliminary voiceprint VP''' (block 172) answered affirmatively, then it can be assumed that one participant 12a-12e introduced another participant 12a-12e. For instance, participant 12c might introduce participant 12d by stating "Mike is here with me" before the participant 12d has spoken. Thus, in block 139 of FIG. 4, the name "Mike" would be saved, and yet the voiceprint obtained from this introduction would already be associated with participant 12c (block 172 answered affirmatively). Thus, the technique 160 would progress to block 174, and the server 12 can wait for a subsequent utterance from participant 12d, and the voiceprint of that participant 12d can be obtained therefrom.

Moreover, it is reasonable to assume that the participant 12d would acknowledge the introduction and say "hello" or another statement immediately following the introduction. Therefore, in block 174, the voice recognition module 22 can gather the voiceprint of participant 12d from the statement immediately following the introduction from participant 12c. In additional embodiments of block 174, the voice recognition module 22 can gather the voiceprint of participant 12d when participant 12d affirms that he or she is speaking. For instance, if participant 12d speaks and another participant 12a-12c, 12e is unaware of the speaker's identity, the other participant 12a-12c, 12e might ask "Is that Mike?" In reply, the participant 12d can speak an affirmation, and the voice recognition module 22 can gather the voiceprint from that affirmation.

As stated above, voiceprints can be gathered from social networks and/or other external sources. In additional embodiments, other data about the participants 12a-12e can also be gathered. For instance, pictures of the participants 12a-12e, personal information about the participants 12a-12e, and other information can be gathered and associated with the names and voiceprints within the database 20. This information can be transmitted to other participants 12a-12e in block 153 (FIG. 4) when the name of the current speaker is sent to the querying participant 12a-12e.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for conducting a teleconference between a plurality of participants over a teleconference system, the teleconference system including a server that is in communication with a plurality of client terminals, the method comprising:

receiving, by the server from one of the client terminals, (i) a first utterance, the first utterance including a plurality of words, the plurality of words including an identifier of one of the plurality of participants and at least one additional word, and (ii) an initial background noise that is local to the one of the plurality of participants;

recognizing, by the server, the plurality of words;

parsing, by the server, the identifier from the at least one additional word;

associating, by the server, (i) the identifier to a voiceprint of the one of the plurality of participants, the voiceprint including a set of vocal characteristics that can be used to identify speech as originating from the one of the plurality of participants, and (ii) the initial background noise to the identifier and the voiceprint;

receiving, by the server from the one of the client terminals, a second utterance and a second background noise from the one of the plurality of participants;

comparing, by the server, (i) the second utterance to the voiceprint, and (ii) the second background noise to the initial background noise in order to confirm that the one of the plurality of participants uttered the second utterance;

determining, by the server and based on the comparing that the identifier is associated with the second utterance; and providing the identifier from the server to at least another client terminal in response to determining that the identifier is associated with the second utterance.

2. The method of claim 1, further comprising obtaining the voiceprint by the server.

3. The method of claim 2, wherein the first utterance is uttered by the one of the plurality of participants, and wherein obtaining the voiceprint includes obtaining the voiceprint from the first utterance.

4. The method of claim 2, wherein obtaining the voiceprint includes obtaining the voiceprint from a previously recorded utterance.

5. The method of claim 2, wherein the first utterance is uttered by another participant other than the one of the plurality of participants, and wherein obtaining the voiceprint includes obtaining the voiceprint from a third utterance from the one of the plurality of participants.

6. The method of claim 1, further comprising receiving, by the server from at least one of the client terminals, a query as to which participant uttered the second utterance, and wherein providing the identifier includes providing the identifier in response to the query.

7. The method of claim 6, wherein providing the identifier in response to the query includes providing a textual message representative of the identifier.

8. The method of claim 6, wherein providing the identifier in response to the query includes providing an audible message representative of the identifier.

9. The method of claim 1, wherein the teleconference system includes a plurality of microphones, and further comprising:

associating, by the server, each of the plurality of microphones with corresponding ones of the plurality of participants;

determining, by the server, which one of the plurality of microphones received the second utterance; and confirming that the one of the plurality of participants uttered the second utterance based on which of the plurality of microphones received the second utterance.

10. A teleconference system comprising:

a plurality of client terminals for respective ones of a plurality of participants; and a server that is in communication with the plurality of client terminals, the server configured to:

receive (i) a first utterance from one of the plurality of client terminals, the first utterance including a plurality of words, the plurality of words including an identifier of one of the plurality of participants and at least one additional word, and (ii) an initial background noise that is local to the one of the plurality of participants;

recognize the plurality of words;

parse the identifier from the at least one additional word;

associate (i) the identifier to a voiceprint of the one of the plurality of participants, the voiceprint including a set of vocal characteristics that can be used to identify speech as originating from the one of the plurality of participants, and (ii) the initial background noise to the identifier and the voiceprint;

receive a second utterance and a second background noise from the one of the plurality of participants;

compare (i) the second utterance to the voiceprint, and (ii) the second background noise to the initial background noise in order to confirm that the one of the plurality of participants uttered the second utterance;

determine, based on the comparing, that the identifier is associated with the second utterance; and provide the identifier to at least another client terminal in response to determining that the identifier is associated with the second utterance.

11. The teleconference system of claim 10, wherein the server is further configured to obtain the voiceprint from the first utterance when the first utterance is uttered by the one of the plurality of participants.

12. The teleconference system of claim 10, wherein the server is further configured to obtain the voiceprint from a previously recorded utterance uttered by the one of the plurality of participants.

13. The teleconference system of claim 10, wherein the server is further configured to obtain the voiceprint from a third utterance when the first utterance is uttered by another participant other than the one of the plurality of participants.

14. The teleconference system of claim 10, wherein the server is further configured to receive a query as to which participant uttered the second utterance, and the server is further configured to provide the identifier in response to the query.

15. The teleconference system of claim 14, wherein the server is further configured to provide a textual message representative of the identifier.

16. The teleconference system of claim 14, wherein the server is further configured to provide an audible message representative of the identifier.

17. The teleconference system of claim 10, further comprising a plurality of microphones, and wherein the server is further configured to:

associate each of the plurality of microphones with corresponding ones of the plurality of participants;

determine which one of the plurality of microphones received the second utterance; and confirm that the one of the plurality of participants uttered the second utterance based on which of the plurality of microphones received the second utterance.

18. A computer-implemented method for conducting a teleconference between a plurality of participants over a teleconference system, the teleconference system including a server that is in communication with a plurality of client terminals, the method comprising:

receiving, by the server from one of the client terminals, (i) a first utterance of one of the plurality of participants, and (ii) an initial background noise that is local to the one of the plurality of participants;

associating, by the server, the initial background noise to the first utterance of the one of the plurality of participants;

receiving, by the server from the one of the client terminals, a second utterance and a second background noise from the one of the plurality of participants;

comparing, by the server, the second background noise to the initial background noise in order to confirm that the one of the plurality of participants uttered the second utterance;

determining, by the server and based on the comparing that the one of the plurality of participants is associated with the second utterance; and providing an identifier associated with the one of the plurality of participants from the server to at least another client terminal in response to determining that the one of the plurality of participants is associated with the second utterance.

19. The method of claim 18, wherein the first utterance includes a plurality of words, the plurality of words including the identifier.

20. The method of claim 19, further comprising:

recognizing, by the server, the plurality of words;

parsing, by the server, the identifier from the plurality of words; and associating, by the server, the identifier to a voiceprint of the one of the plurality of participants, the voiceprint including a set of vocal characteristics that can be used to identify speech as originating from the one of the plurality of participants.

* * * * *